(12) United States Patent
Schoubye et al.

(10) Patent No.: US 7,052,669 B2
(45) Date of Patent: May 30, 2006

(54) PROCESS FOR PRODUCTION OF AMMONIUM THIOSULPHATE

(75) Inventors: Peter Schoubye, Vedbæk (DK); Kurt Agerbæk Christensen, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 369 days.

(21) Appl. No.: 10/464,519

(22) Filed: Jun. 19, 2003

(65) Prior Publication Data

US 2003/0223930 A1     Dec. 4, 2003

Related U.S. Application Data

(63) Continuation-in-part of application No. 09/938,519, filed on Aug. 27, 2001, now abandoned.

(30) Foreign Application Priority Data

Apr. 5, 2001   (DK) .......................... PA 2001 00568
Jun. 20, 2002  (DK) .......................... PA 2002 00950

(51) Int. Cl.
       *C01B 17/64*        (2006.01)
(52) U.S. Cl. .................... 423/514; 423/519; 423/519.2
(58) Field of Classification Search ................ 423/514, 423/519, 519.2
       See application file for complete search history.

(56) References Cited

U.S. PATENT DOCUMENTS

| | | | |
|---|---|---|---|
| 2,219,258 A | 10/1940 | Hill | |
| 2,412,607 A | 12/1946 | Farr et al. | |
| 3,431,070 A | 3/1969 | Keller | |
| 3,473,891 A | 10/1969 | Mack et al. | |
| 3,524,724 A | 8/1970 | Every et al. | |
| 3,591,335 A | 7/1971 | Grimsley et al. | |
| 3,937,793 A | 2/1976 | Metzger et al. | |
| 4,478,807 A | 10/1984 | Ott | |
| 4,627,964 A | 12/1986 | Audeh | |
| 6,159,440 A | 12/2000 | Schoubye | |
| 6,534,030 B1 * | 3/2003 | Anderson et al. | ........... 423/514 |
| 2002/0131927 A1 | 9/2002 | Anderson et al. | |

FOREIGN PATENT DOCUMENTS

| | | | |
|---|---|---|---|
| EP | 0 928 774 A1 | | 7/1999 |
| GB | 362699 | * | 12/1931 |
| GB | 713746 | * | 8/1954 |
| GB | 718675 | * | 11/1954 |

(Continued)

OTHER PUBLICATIONS

Gmelins Handbuch der Anorganischen Chemie, 8th Ed., System No. 23, pp. 304-305.

(Continued)

*Primary Examiner*—Steven Bos
*Assistant Examiner*—Ardith E. Hertzog
(74) *Attorney, Agent, or Firm*—Dickstein Shapiro Morin & Oshinsky LLP

(57) ABSTRACT

A process for continuous production of ammonium thiosulphate, $(NH_4)_2S_2O_3$ (ATS) from $NH_3$, $H_2S$ and $SO_2$ is disclosed. A first feed stream comprising $H_2O$, $H_2S$ and $NH_3$ with a molar $H_2S:NH_3$ ratio <0.4 is partially condensed to form a condensate. The condensate is contacted with a third feed gas comprising $H_2S$ and the gas stream comprising $NH_3$ and $H_2S$ is passed to a mixing device where the gas stream is dissolved in water drained off from an aerosol filter. A second feed gas stream comprising approximately ⅔ mole $SO_2$ per mole of $NH_3$ contained in the first feed stream is passed to a $SO_2$ absorber. The aqueous solution produced in mixing device is contacted with the $SO_2$ absorber.

10 Claims, 2 Drawing Sheets

FOREIGN PATENT DOCUMENTS

| | | | |
|---|---|---|---|
| GB | 1175069 | * | 12/1969 |
| NL | 7308367 | | 12/1973 |
| WO | WO 02/072243 A1 | | 9/2002 |
| WO | WO 02/081370 A1 | | 10/2002 |

OTHER PUBLICATIONS

Chemical Abstracts, "Production of Crystallized Ammonium Thiosulfate," vol. 62, Col. 8713 (1965).
Chemical Abstracts No. 106/517t, vol. 68, p. 10,300 (1968).
Chemical Abstracts No. 89:8,434c; vol. 89, p. 128 (1978).
Chemical Abstracts No. 92:25,114c, vol. 92, p. 170 (1980).
Chemical Abstracts No. 94:89268e, vol. 94, p. 338 (1981).
Chemical Abstracts No. 97:147028b, vol. 97, p. 135 (1982).
Chemical Abstracts No. 101:173945u, vol. 101, p. 152 (1984).
Chemical Abstracts No. 107:179463f, vol. 107, p. 206 (1987).
Chemical Abstracts No. 127:360681d; 127:360682e; 127:360683f and 127:380684g, vol. 127, No. 26 (1997).
Chemical Abstracts, "Removing Ammonia and Hydrogen Sulfide from Gases," p. 3365 (1932).
Chemical Abstracts, "Purification of Gases," vol. 27, p. 1144 (1930).
Chemical Abstracts, "Obtaining $(NH_4)_2S_2O_3$," vol. 38, p. 4103 (1944).
Chemical Abstracts, "Ammonium Salts," vol. 49 p. 3487 (1954).
Chemical Abstracts, "Ammonium Thiosulfate," vol. 49, p. 3487 (1954).

* cited by examiner

PROCESS FOR PRODUCTION OF AMMONIUM THIOSULPHATE

This is a continuation-in-part of U.S. application Ser. No. 09/938,519, filed Aug. 27, 2001, now abandoned.

INTRODUCTION

The present invention relates to a process for continuous production of a concentrated solution of ammonium thiosulfate (ATS) from off gases comprising $H_2S$ and $NH_3$ such as refinery SWS (Sour Water Stripper)-gas, which contains $NH_3$ as well as $H_2S$ and $H_2S$ gas streams.

The process according to the invention is distinguished by utilizing only the $NH_3$ in the SWS gas for the production of high purity ATS solution, thus producing 7.25 kg 60% ATS solution per kg of $NH_3$ in the SWS gas treated in the process. Furthermore, when the process according to the invention uses the effluent gas of a Claus plant as $SO_2$-source for the process, the total sulphur-recovery of the Claus plant and the ATS plant taken together is increased to more than 99.95% with only 86–95% sulphur recovery being required in the Claus plant.

BACKGROUND AND OBJECTIVE FOR THE INVENTION

It is known to produce aqueous solutions of ATS by reacting a solution of ammonium sulphite with sulphur in liquid form or with sulphides or polysulphides in aqueous solution as described in Kirk-Othmer Encyclopedia of Chemical Technology, $4^{th}$ edition, 1997, vol 24, page 62 and in U.S. Pat. Nos. 2,412,607; 3,524,724 and 4,478,807.

It is furthermore known from U.S. Pat. No. 3,431,070 to produce ATS in a continuous process from gaseous feed streams comprising $H_2S$, $NH_3$ and $SO_2$. By the process of this invention ATS and sulphur is produced from a first feed gas stream comprising $H_2S$ and $NH_3$ and a second feed gas stream comprising $SO_2$ in three absorption steps. In a first absorber, $NH_3$ and $H_2S$ are separated in a $H_2S$ off-gas stream and an $NH_3$-rich solution of ATS. The main part of the solution is passed to a second absorber, in which it is contacted with the $SO_2$-rich feed gas stream under formation of an off-gas that is vented and a solution rich in ATS and ammonium sulphites, which in a third absorber is contacted with the $H_2S$-gas from the first absorber and, optionally, with additional $H_2S$. After removal of sulphur being formed in the third absorber, the major part of the ATS-solution formed in the third absorber is recycled to the first absorber, while a minor part is mixed with a fraction of the $NH_3$-rich solution of ATS formed in the first absorber forming the product solution of ATS.

There are three major disadvantages of this process: Elementary sulphur is formed in the third absorber and must be separated from the solution, the off-gas vented from the third absorber has a high concentration of $H_2S$ and the process is complicated with three integrated absorption steps.

It is also known from EP 0 928 774 A1 to produce an aqueous solution of ATS from gaseous feed streams comprising $NH_3$, $H_2S$ and possibly $SO_2$. By the process of this patent, a concentrated solution of ammonium hydrogen sulphite (AHS) is produced from $NH_3$ and $SO_2$ in a first absorption step comprising one or two absorbers in series. Said solution is contacted in a second absorption step with a gaseous mixture of $H_2S$ and $NH_3$ forming the product solution of ATS.

The major disadvantage of this process is that it requires import of $NH_3$ for the process.

Furthermore, a process is known from Danish Patent No. 174407, wherein ATS is produced by using only the $NH_3$ contained in the SWS-gas stream as the $NH_3$ source for ATS-production.

In said process a first feed stream, typically SWS-gas, comprising more than 0.33 mole $H_2S$ per mole of $NH_3$ is contacted with a stream of sulphite solution in line 18 in the drawing FIG. 1 and FIG. 2 in said patent application in a reactor A1 for formation of ATS. However, experiments have shown that the presence of excess $H_2S$ for the formation of ATS from sulphites in the reactor will lead to the presence of free sulphide in the product solution (line 12), part of which is recycled (line 17) to the $SO_2$ absorber (A2), in which the sulphide will be decomposed to give $H_2S$ in the absorber effluent gas (line 19). Furthermore, the large recycle of solution (line 13) to the $SO_2$ absorber and back to the reactor (lines 17–18) is also a disadvantage of the process.

The objective of this invention is to establish an improved process for the production of ATS in which over 99.9% of all sulphur and all $NH_3$ in the feed streams are recovered as ATS without any of the above mentioned disadvantages.

SUMMARY OF THE INVENTION

This invention relates to a process for continuous production of ammonium thiosulphate, $(NH_4)_2S_2O_3$ (ATS) from $NH_3$, $H_2S$ and $SO_2$ comprising following steps:

(a) partial condensation in a partial condenser 4 of a first gaseous or partial liquid feed stream comprising $H_2O$, $H_2S$ and $NH_3$ with a molar $H_2S$:$NH_3$ ratio <0.4, preferably in the range 0.1–0.25;

(b) passing the aqueous condensate comprising $NH_4HS$ and $NH_3$ from the partial condenser 4 through line 5 to a reactor 9 in which said condensate is contacted with a third feed gas stream comprising $H_2S$ supplied through line 7 and with an aqueous solution comprising $NH_4HSO_3$ (AHS) and $(NH_4)_2SO_3$ (DAS) supplied through line 10 under formation of an aqueous solution of ATS being removed from the reactor through line 12;

(c) passing the gas stream comprising $NH_3$ and $H_2S$ from the partial condenser 4 through line 6 to a mixing device 13 in which said gas stream is completely dissolved in the water that is drained off from the aerosol filter 25 and passed to 13 through the line 26;

(d) passing a second feed gas stream in line 20 comprising in principle ⅔ mole $SO_2$ per mole of $NH_3$ comprised in the first feed stream to a $SO_2$ absorber 21 and the aerosol filter 25;

(e) passing the aqueous solution produced in mixing device 13 through line 14 to the $SO_2$ absorber 21;

(f) passing the off gas from absorber 21 through line 23 and 24 to an aerosol filter 25 to which is added, through line 30, the balance amount of water required for obtaining about 60 wt % (40–65 wt %) ATS in the aqueous solution removed from the reactor 9 in line 12.

Step (e) can preferably be carried out by adding said aqueous solution to the liquid recycle loop 27 of the $SO_2$-absorber.

These and other features and advantages of the invention will be more apparent from the following detailed description that is provided in connection with the accompanying drawings and illustrated exemplary embodiments of the invention.

DETAILED DESCRIPTION OF THE PREFERRED EMBODIMENT OF THE INVENTION

Figure 1:
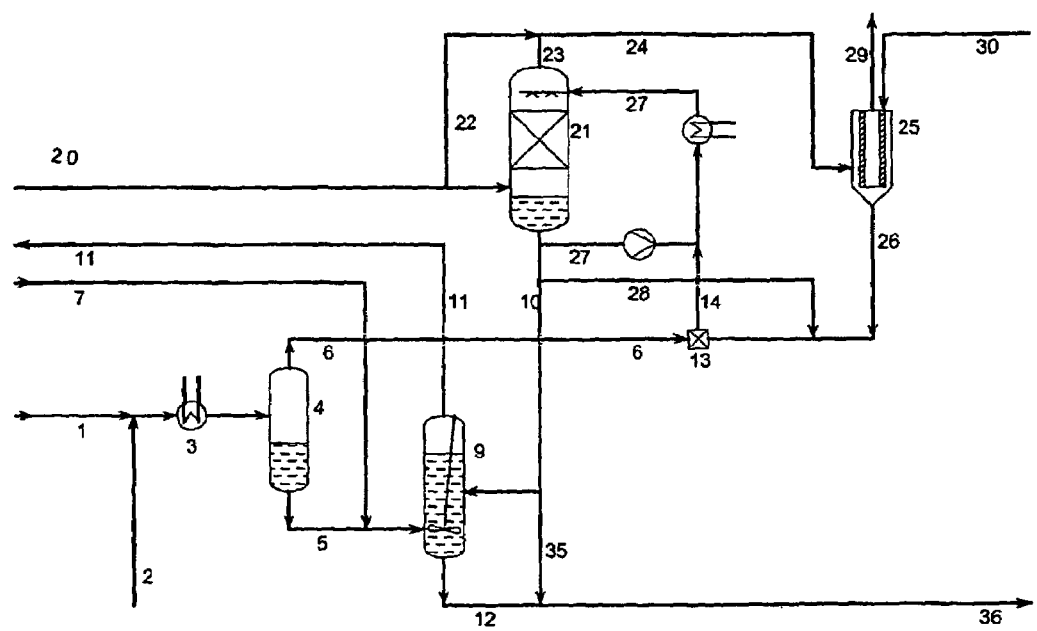
FIG. 1 illustrates the formation of ammonium thiosulphate in accordance with an exemplary process of the present invention.

Referring to the drawing FIG. 1, a first feed stream of fractionated SWS-gas in line 1 comprising, for example, 6 kmole/h $NH_3$ associated with 1.1 kmole/h $H_2S$ and 2 kmole/h $H_2O$, is treated with a second feed gas stream in line 20 comprising $SO_2$ associated with water vapor and inert components such as $N_2$, $CO_2$ and $O_2$ and a 3d feed gas stream comprising $H_2S$ in line 7. Feed water required for the process is fed in line 30 to the aerosol filter 25. Some feed water may also be added in line 2 to the first feed gas stream. More than 99.95% of the amounts of $NH_3$ and $SO_2$ in the feed streams are recovered in the product ATS stream exiting the process in line 36. Thus, the off gas from the process in line 29 contains a negligible amount of $SO_2$ and essentially no $NH_3$ and $H_2S$.

The original SWS-gas available in refineries usually have a molar $H_2S:NH_3$ ratio of about 1:1, which is higher than directly acceptable for the process. Therefore, the original SWS-gas must first be fractionated by known methods in columns not shown on the figure to give a feed gas stream in line 1 with less than about 0.35 mole $H_2S$ per mole of $NH_3$ in the feed gas, preferably with a $H_2S:NH_3$ molar ratio in the range of 0.1–0.25. The two other off streams (not shown in FIG. 1) from said fractionation are $H_2S$, which can be used as make-up for stream 7, and practically pure water. Experiments with the process have shown that with $H_2S:NH_3>$about 0.35 in stream 1, it will be very difficult or impossible to avoid presence of free sulphide in the ATS product stream in line 36 and/or presence of $H_2S$ in the process exit gas in line 29. A $H_2S:NH_3$ ratio of about 1.1:6=0.18 in feed stream 1 seems very suitable for conducting the process according the invention.

The amounts of $H_2S$, $SO_2$ and $H_2O$ comprised in the feed streams for production of a 60% ATS solution from 6 kmole $NH_3$ in the first feed stream are calculated from the mass balance of the over-all process:

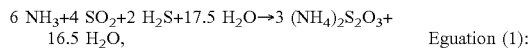

$$6\ NH_3 + 4\ SO_2 + 2\ H_2S + 17.5\ H_2O \rightarrow 3\ (NH_4)_2S_2O_3 + 16.5\ H_2O, \quad \text{Equation (1)}$$

corresponding to the following amounts in kg:

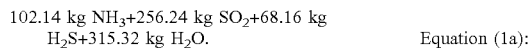

$$102.14\ \text{kg}\ NH_3 + 256.24\ \text{kg}\ SO_2 + 68.16\ \text{kg}\ H_2S + 315.32\ \text{kg}\ H_2O. \quad \text{Equation (1a)}$$

give 741.86 kg 60% ATS solution.

The first feed stream comprising 6 kmole $NH_3$, 1.1 kmole $H_2S$ and 2 kmole $H_2O$ in line 1 is cooled in the cooler 3 to a temperature between 20° C. and 60° C., or well below its dew point upstream of the partial condenser 4. In the partial condenser 4 the first feed stream is separated in an aqueous solution exiting in line 5 comprising $NH_4HS$ and some $NH_3$ dissolved in practically all of the water in the feed stream 1, and in a gas phase exiting in line 6 comprising most of the $NH_3$ (approximately 4.6 kmole $NH_3$) and a small amount of $H_2S$ (approximately 0.1 kmole $H_2S$). Water may be added in line 2 upstream of 4, but in the example the amount of water added to the process at this point is chosen to be zero. The liquid stream 5 comprising in the example 1.0 kmole $NH_4HS$, 0.4 kmole $NH_3$ and 2 kmole $H_2O$ goes to the reactor 9 in which it is reacted with (0.9+x) kmole $H_2S$, the third feed stream and as defined below, introduced in line 7 and with the liquid sulphite stream 10 comprising 0.15 kmole ATS, 3.3 kmole AHS ($NH_4HSO_3$), 0.5 kmole DAS (($NH_4)_2SO_3$) and 11.65 kmole $H_2O$. In the reactor 9 ATS will be formed by the principal reactions:

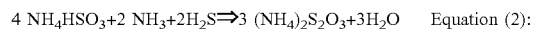

$$4\ NH_4HSO_3 + 2\ NH_3 + 2H_2S \Rightarrow 3\ (NH_4)_2S_2O_3 + 3H_2O \quad \text{Equation (2)}$$

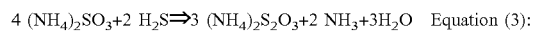

$$4\ (NH_4)_2SO_3 + 2\ H_2S \Rightarrow 3\ (NH_4)_2S_2O_3 + 2\ NH_3 + 3H_2O \quad \text{Equation (3)}$$

resulting in formation of 741.8 kg of 60% ATS solution leaving the reactor through line 12.

An excess amount of x kmole $H_2S$ may be added to the feed stream of 0.9 kmole $H_2S$, which constitutes the third feed gas stream, in line 7 in order to increase the rates of reactions 2 and 3. The x kmole $H_2S$, which may constitute 0–10% of equivalent amount of $H_2S$ required for the process, is vented from the reactor through the vent line 11.

Additional sulphite solution may be added through line 35 to the ATS product solution having e.g. a composition of 60% ATS (3 kmol ATS and 16.5 kmol water), in order to complete the conversion to ATS of possible traces of sulphide or $H_2S$ in the stream 12 and/or to add 0–2% DAS to the product ATS solution exiting the process in line 36. For simplicity, no sulphite is added through line 35 in the present example. pH of the solution in line 12 and in the reactor 9 will typically be in the range 7.6–8.6.

The off gas from 4 (4.6 kmol $NH_3$ and 0.1 kmol $H_2S$) is passed to the mixing device 13 in which it is completely dissolved in the aqueous stream 26 from the aerosol filter 25. Stream 26 will usually comprise at least 0.1 kmole AHS which reacts with the $H_2S$ and $NH_3$ in stream 6 under formation of ATS according to for instance equation 2. A minor fraction of the sulphite solution exiting the $SO_2$-absorption is added to stream 26 through line 28 in order to ensure complete removal of all $H_2S$ or sulphide in the aqueous stream 14 before it is added to the $SO_2$ absorption loop 27. Stream 28 may comprise a flow of sulphite ($NH_4HSO_3$) and $(NH_4)_2SO_3$ which, together with the sulphite in the off stream from the aerosol filter 25, relates to the flow of sulphide ($H_2S+NH_3HS$) in the stream from the condenser 4 by a molar ratio of 2:1 or more. Addition of excess ammonium sulphites through 28 will also keep pH in stream 14 below of about 9.2. If pH is higher than 9.2 in stream 14 (due to the high concentration of $NH_3$ in said stream), the formation of ATS from the sulphide may be inhibited leading to liberation of $H_2S$ in the $SO_2$-absorber 21 and to presence of $H_2S$ in the absorber off gas.

The flow of $SO_2$ (second feed gas stream) required for the process is in line 20 fed to the $SO_2$-absorber 21 in which the $SO_2$ is in principle absorbed by the $NH_3$ comprised in the $NH_3$-rich off gas in line 6 from the partial condensation in 4 of the feed stream 1. According to the over-all mass balance of the present example given in equation 1, 4.0 kmole $SO_2$ is required for the process. As the $SO_2$ feed stream is produced by upstream combustion of $H_2S$ or other sulphurous components, the $SO_2$ in line 20 will be diluted with inert gas comprising $N_2$, $CO_2$ and $O_2$ and with water vapor. In FIG. 1 it is assumed that the 4 kmole $SO_2$ is diluted with approximately 100 kmole inert gases and 6 kmole $H_2O$ corresponding to a $H_2O$ dew point of 35–36° C.

The $SO_2$ absorber 21 is typically a fixed bed absorber where the absorption liquid is recycled in a loop 27 comprising a circulating pump and a cooler which maintains the temperature of absorption preferably at 35–40° C., whereby no net condensation or net evaporation of $H_2O$ takes place in the absorber and in the subsequent aerosol filter 25. The pH value of the aqueous solution comprising $NH_4HSO_3$ and $(NH_4)_2SO_3$ used for absorption of $SO_2$ in the absorber 21 is adjusted between approximately 5 and approximately 7.5. The $SO_2$ absorber 21 may also be a packed column or a bubbling tank reactor.

In the example in FIG. 1, 15.5 kmole/h water is supplied to the aerosol filter 25 for instance by spraying the water on the filter candles. As there will be practically no $NH_3$, $SO_2$ or aerosols in the process off gas in line 29, the aqueous solution exiting the absorber in line 10 (after subtraction of the fraction taken out in line 28) can be calculated from the mass balances to be 617.2 kg/h solution comprising 0.15 kmole/h ATS, 3.3 kmole/h AHS, 0.5 kmole/h DAS and 11.65 kmole/h $H_2O$. The equilibrium partial pressures of $NH_3$ of this solution at 40° C. have been found to be approximately $10^{-3}$ bars higher than that of $SO_2$.

In order to recover this $NH_3$, 0.1 kmole $SO_2$ is added to the $SO_2$ absorber effluent gas by bypassing in line 22 about 0.1/4=2.5% of the gas flow in line 20 around the $SO_2$ absorber and adding said bypass stream to the absorber effluent gas in line 23. The $NH_3$ and $SO_2$ react in the gas phase forming an aerosol of AHS, which is removed in the filter 25. All aerosols present in the gas leaving the $SO_2$-absorber will also be removed and dissolved in the water supplied to the filter. The filter off gas in line 29 contains typically about 40 ppm $SO_2$, less than 2 ppm $NH_3$ and essentially no $H_2S$.

Separation in the partial condenser 4 of the fractionated SWS-feed gas stream in a gaseous $NH_3$-rich stream 6 and a liquid stream 5 is very advantageous but not strictly necessary for the process.

The separation can in principle be replaced by splitting stream 1 in a stream 5 being passed to 9 together with stream 7 and a stream 6 being mixed in 13 in principle as seen in FIG. 1.

The $SO_2$-absorption may also be carried out with two $SO_2$-absorbers connected in series, or the $SO_2$-absorber 21 may be a bubbling $SO_2$-absorber in which the feed gas in line 20 is bubbled through the absorbing solution with or without external circulation in a loop 27 as shown in FIG. 1.

A fraction of the second feed gas stream can be by-passed the absorber 21 and mixed with the effluent gas from the absorber 21 upstream of the aerosol filter 25. The fraction can contain 0.7–1.3 moles of $SO_2$ per mole of $NH_3$ contained in the off gas from the $SO_2$-absorber 21.

Essentially complete conversion of sulphide to $(NH_4)_2S_2O_3$ in the process and a desired concentration of excess $(NH_4)_2SO_3$ and $NH_4HSO_3$ of 0–2 wt % in the product exit stream 36 are achieved (1) by adjusting the feed rate of $H_2S$ in line 7 to give a small stream in line 11 of excess $H_2S$ in the range of 0–10% of the equivalent amount of $H_2S$ for the production of ATS and (2) by bypassing a minor fraction of stream 10 through line 35 to stream 12. In other words, the feed rate of $H_2S$ in the third feed stream 7 is adjusted to give an excess effluent $H_2S$ stream from the reactor 9 of 0–10% of the equivalent amount of $H_2S$ for the production of $(NH_4)_2S_2O_3$ and a fraction 10 of the solution produced in the $SO_2$ absorber 21 is bypassed to the $(NH_4)_2S_2O_3$ solution withdrawn from the reactor 9.

Use of the present ATS process is in particular advantageous when the off gas from a Claus plant is used as source for the $SO_2$ required for the process. This is seen in the overview in FIG. 2 of sulphur recovery with a simple Claus process combined with the present ATS process in a refinery producing $H_2S$ and SWS-gas from various hydrogenation and cracking treatments of hydrocarbons. Without use of the ATS process all $H_2S$ and SWS gas had to be treated in the Claus plant and the ammonia had to be decomposed at substantial costs. No more than 95–97% sulphur recovery can be achieved in simple 2 or 3-bed Claus plants. Higher degrees of sulphur recovery require expensive processes for tail gas treatment. Increasing the sulphur recovery to more than 99% by known processes is very expensive investment wise as well as with regard to operating costs and energy consumption. However, 99.95% total sulphur recovery or more is automatically achieved with no increase in operating costs and energy consumption by utilizing the off gas from a simple 2-bed Claus plant as the $SO_2$-source for the present ATS process utilizing the SWS-gas for ATS-production, as shown in the schematic drawing in FIG. 2.

Figure 2:
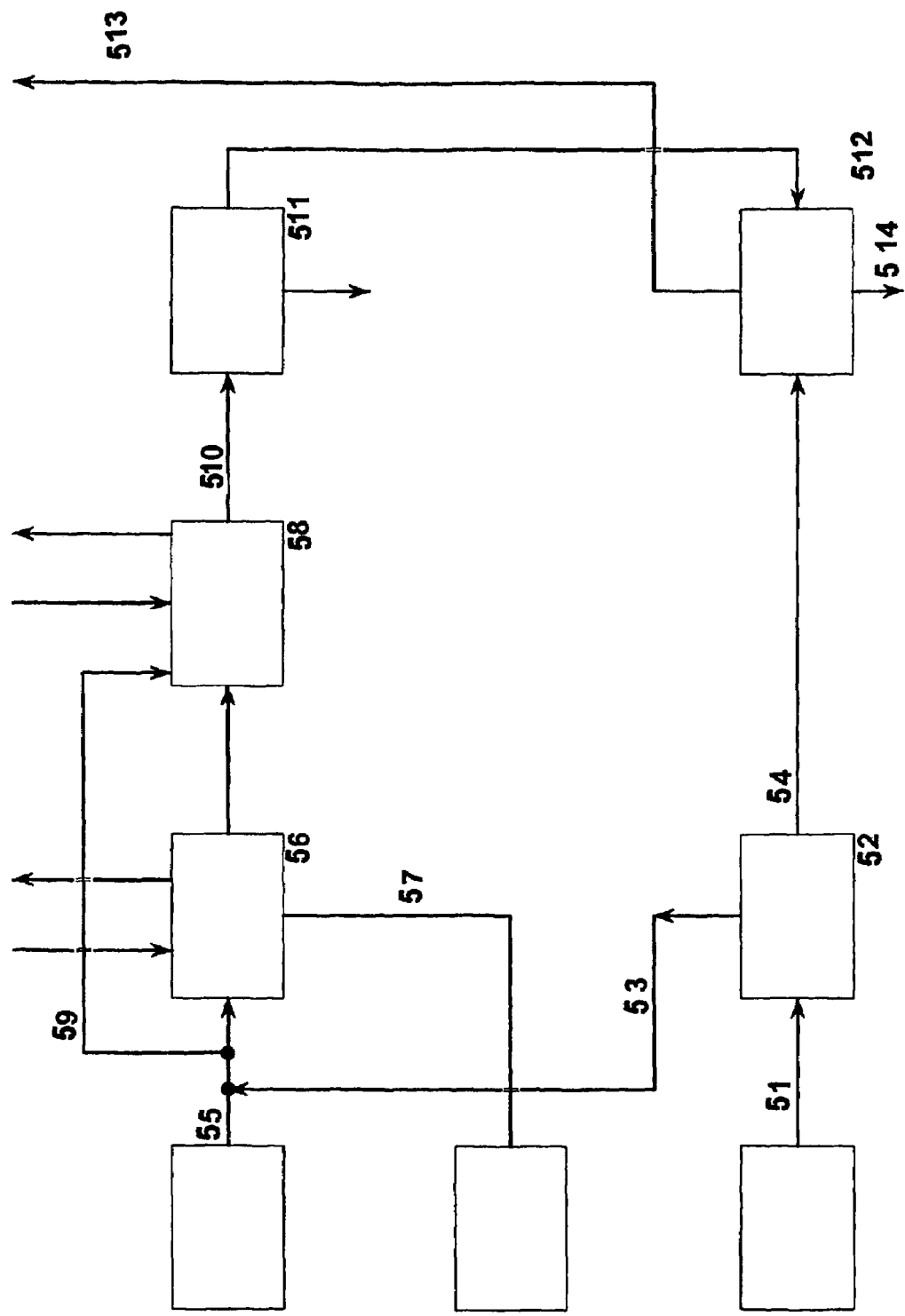
FIG. 2 illustrates the formation of ammonium thiosulphate incorporating a Claus plant and in accordance with the exemplary process of the present invention shown in FIG. 1.

Referring to FIG. 2, the SWS gas containing e.g. 1 kmol ammonia and 1 kmol hydrogen sulphide, in line 51 is sent to a fractionation unit 52, in which it is split into an $H_2S$-rich stream 53 having e.g. ⅔ kmol hydrogen sulphide, and an $NH_3$-rich stream 54 containing all the $NH_3$ and approximately 0.33 mole $H_2S$ per mole $NH_3$. The $H_2S$-rich stream 53 is mixed with an $H_2S$ gas having e.g. 9 kmol hydrogen sulphide, in line 55 and sent to a Claus plant 56, in which most of the $H_2S$ is recovered as sulphur in line 57. Air is also required in the Claus plant 56 and steam is produced. The sulphur recovery can be e.g. more than 93.1%. The off-gas from the Claus plant is sent to a tail gas incinerator 58, in which the $H_2S$ is combusted to $SO_2$ with an excess of air. Steam is produced. A fraction of the Claus feed gas is bypassed (hydrogen sulphide bypass) around the Claus plant in line 59 to the tail gas incinerator and combusted to $SO_2$. The bypass flow in line 59 is adjusted to give approximately ⅔ mole $SO_2$ in the off-gas from the incinerator in line 510 per mole $NH_3$ contained in the SWS gas in line 51. In order to produce concentrated ATS solution, a fraction of the water contained in the off-gas from the incinerator is removed in a condensation step 511. The $H_2O$ content of the off-gas from the condensation step is reduced to 3–10 vol % $H_2O$, preferably 6 vol % $H_2O$. The off-gas from the condensation step containing approximately ⅔ mole $SO_2$ is sent to the ATS process 512 according to the present invention, in which the $SO_2$ is removed by reaction with the $NH_3$-rich stream 54 from the fractionation unit 52. The purified gas stream 513 is vented through the stack and the product ATS solution (e.g. a 60% solution with 0.5 kmol ATS) is recovered in line 514.

The invention claimed is:
1. A process for continuous production of ammonium thiosulphate, $(NH_4)_2S_2O_3$ (ATS) from $NH_3$, $H_2S$ and $SO_2$ comprising steps of:
(a) partial condensation in a partial condenser of a first gaseous or partial liquid feed stream comprising $H_2O$, $H_2S$ and $NH_3$ with a molar $H_2S:NH_3$ ratio <0.4;
(b) passing the aqueous condensate comprising $NH_4HS$ and $NH_3$ from the partial condenser to a reactor in which said condensate is contacted with a third feed gas stream comprising $H_2S$ and with an aqueous solution comprising $NH_4HSO_3$ and $(NH_4)_2SO_3$ under formation of an aqueous solution of $(NH_4)_2S_2O_3$;
(c) passing the gas stream comprising $NH_3$ and $H_2S$ from the partial condenser to a mixing device in which said gas stream is completely dissolved in the water drained off from an aerosol filter;

(d) passing a second feed gas stream comprising approximately ⅔ mole $SO_2$ per mole of $NH_3$ contained in the first feed stream to a $SO_2$ absorber and the aerosol filter;

(e) passing the aqueous solution produced in mixing device to the $SO_2$ absorber;

(f) passing the off gas from the absorber to the aerosol filter; and (g) adding to the aerosol filter a balance amount of water required for obtaining approximately 40–65 wt % $(NH_4)_2S_2O_3$ in the aqueous solution of $(NH_4)_2S_2O_3$ being withdrawn from the reactor.

2. The process of claim 1, wherein the first feed stream of step (a) is divided into a substream being passed to the mixing device and a further substream which is contacted in the reactor with the third feed stream comprising $H_2S$ and with an aqueous solution comprising $NH_4HSO_3$ and $(NH_4)_2SO_3$ under formation of an aqueous solution of $(NH_4)_2S_2O_3$.

3. The process of claim 1, wherein a fraction of the second feed gas stream is by-passed the absorber and mixed with the effluent gas from the absorber upstream of the aerosol filter, said fraction containing 0.7–1.3 moles of $SO_2$ per mole of $NH_3$ contained in the off gas from the $SO_2$-absorber.

4. The process of claim 1, wherein the $SO_2$-absorber is a packed column.

5. The process of claim 1, wherein the $SO_2$-absorber is a bubbling tank reactor with or without external liquid recycle.

6. The process of claim 1, wherein a fraction of the solution comprising $NH_4HSO_3$ and $(NH_4)_2SO_3$ produced in the $SO_2$-absorber is passed to the mixing device, said fraction of the solution comprising a flow of sulphite ($NH_4HSO_3$ and $(NH_4)_2SO_3$) which together with the sulphite in the off stream from the aerosol filter relates to the flow of sulphide ($H_2S+NH_3HS$) in the stream from the condenser by a molar ratio of 2:1 or more.

7. The process of claim 1, wherein the second feed gas stream is an effluent gas stream from a Claus plant which is incinerated and its $H_2O$-content reduced to 3–10 vol % $H_2O$ by cooling and partial condensation of its content of $H_2O$ upstream of said process.

8. The process of claim 1, wherein the first feed stream is Sour Water Stripper gas having been fractionated and adjusted to contain $H_2S$ and $NH_3$ to a molar ratio of $H_2S:NH_3$ of <0.4.

9. The process of claim 1, wherein the pH value of the aqueous solution comprising $NH_4HSO_3$ and $(NH_4)_2SO_3$ used for absorption of $SO_2$ in the absorber is adjusted between approximately 5 and approximately 7.5.

10. The process of claim 1, wherein the feed rate of $H_2S$ in the third feed stream is adjusted to give an excess effluent $H_2S$ stream from the reactor of 0–10% of the equivalent amount of $H_2S$ for the production of $(NH_4)_2S_2O_3$ and a fraction of the solution produced in the $SO_2$ absorber is bypassed through line to the $(NH_4)_2S_2O_3$ solution withdrawn from the reactor.

* * * * *